(12) United States Patent
Fukawatase

(10) Patent No.: US 8,814,250 B2
(45) Date of Patent: Aug. 26, 2014

(54) AUTOMOBILE FRONT PORTION STRUCTURE

(75) Inventor: Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/989,193

(22) PCT Filed: Jan. 27, 2011

(86) PCT No.: PCT/JP2011/051676
§ 371 (c)(1),
(2), (4) Date: May 23, 2013

(87) PCT Pub. No.: WO2012/101810
PCT Pub. Date: Aug. 2, 2012

(65) Prior Publication Data
US 2013/0300139 A1 Nov. 14, 2013

(51) Int. Cl.
*B60R 19/34* (2006.01)
*B60R 19/36* (2006.01)

(52) U.S. Cl.
CPC .................. *B60R 19/34* (2013.01); *B60R 19/36* (2013.01)
USPC ........................................................ 296/133

(58) Field of Classification Search
USPC ................. 293/133, 102, 120, 132, 121–126; 296/203.01; 188/374, 268
See application file for complete search history.

(56) References Cited

U.S. PATENT DOCUMENTS

| | | | |
|---|---|---|---|
| 5,033,593 A * | 7/1991 | Kazuhito ...................... 188/377 |
| 5,201,912 A * | 4/1993 | Terada et al. ................. 293/120 |
| 5,314,229 A | 5/1994 | Matuzawa et al. |
| 6,203,098 B1 | 3/2001 | Motozawa et al. |
| 6,648,383 B2 * | 11/2003 | Vismara et al. ............... 293/120 |
| 6,758,506 B2 * | 7/2004 | Malteste et al. .............. 293/102 |
| 6,814,381 B1 * | 11/2004 | Frank ............................ 293/133 |
| 6,926,325 B2 * | 8/2005 | Frank ............................ 293/133 |
| 7,484,779 B2 * | 2/2009 | Takahashi ..................... 293/117 |
| 2004/0135382 A1 | 7/2004 | Sakuma et al. |
| 2004/0171321 A1 | 9/2004 | Plant |
| 2007/0155851 A1 * | 7/2007 | Alli et al. ...................... 523/106 |
| 2012/0024138 A1 * | 2/2012 | Carberry et al. ............. 89/36.02 |

FOREIGN PATENT DOCUMENTS

| | | |
|---|---|---|
| DE | 197 36 803 A1 | 2/1998 |
| JP | A-5-139242 | 6/1993 |
| JP | A-6-107094 | 4/1994 |
| JP | A-2000-53019 | 2/2000 |

(Continued)

OTHER PUBLICATIONS

Jun. 18, 2013 Office Action issued in Japanese Patent Application No. 2012-554591 (with English Translation).

*Primary Examiner* — Glenn Dayoan
*Assistant Examiner* — Sunsurraye Westbrook
(74) *Attorney, Agent, or Firm* — Oliff PLC

(57) ABSTRACT

In an automobile front portion structure, a dilatant impact absorbing body that is formed from a material having dilatant characteristics is accommodated at an inner side of a crash box and is fixed to a front end surface of a front side member. A length dimension in a vehicle longitudinal direction of this dilatant impact absorbing body is set such that, when an axial compressive deformation amount of the crash box becomes greater than or equal to a set value that is smaller than a maximum value of the axial compressive deformation amount, the dilatant impact absorbing body receives compressive load between the front side member and a front bumper reinforcement.

4 Claims, 5 Drawing Sheets

(56) References Cited

FOREIGN PATENT DOCUMENTS

| JP | A-2001-219869 | 8/2001 |
| JP | A-2005-1431 | 1/2005 |
| JP | A-2005-514222 | 5/2005 |
| JP | B2-4004924 | 11/2007 |
| JP | A-2009-263896 | 11/2009 |

* cited by examiner

AUTOMOBILE FRONT PORTION STRUCTURE

TECHNICAL FIELD

The present invention relates to an automobile front portion structure, and in particular, to an automobile front portion structure in which a crash box is disposed between a front side member and a front bumper reinforcement.

BACKGROUND ART

In the front end module shown in following Patent Document 1, crash boxes, that are welded to the rear wall portion of a front bumper reinforcement, are mounted to overhanging portions that are provided at left and right radiator support sides. The crush remainder allowance of the crash boxes is set to be greater than the longitudinal dimensions of cooling system parts. At the time of a minor collision, the impact energy is absorbed by deforming (damaging) only the crash boxes and the front bumper reinforcement. Due thereto, damage to the cooling system parts at the time of a minor collision is prevented, and the ability to withstand damage and the repairability of the vehicle body front portion are improved.
[Patent Document 1] Japanese Patent Application Laid-Open No. 2001-219869

DISCLOSURE OF INVENTION

Technical Problem

By the way, at the time of a collision that surpasses a minor collision, i.e., at the time of a collision in which the collision speed is high, the impact that the passenger receives from the seatbelt or the airbag is large. In particular, in an automobile whose front nose is short, ensuring the deformation stroke (the energy absorbing amount) of the vehicle body front portion is difficult, and therefore, there is the tendency for the impact to become large as described above. In order to reduce such an impact, it is preferable to, by increasing (raising) the deceleration of the vehicle body floor portion (hereinafter called "floor G") sharply at the initial stage of the collision, reduce the floor G at the middle stage of the collision and thereafter, and due thereto, reduce the maximum value of the passenger deceleration that rises at the middle stage of the collision and thereafter.

However, in the above-described front end module, the floor G does not increase sharply until the crash box is completely crushed, i.e., until the axial compressive deformation amount of the crash box becomes a maximum, and therefore, there is room for improvement with regard to this point.

In consideration of the above-described circumstances, an object of the present invention is to provide an automobile front portion structure that can improve the ability to withstand damage and the repairability of a vehicle body front portion, and can suddenly increase the floor G before the axial compressive deformation amount of a crash box becomes a maximum.

Solution to Problem

An automobile front portion structure relating to a first aspect of the invention comprises: a crash box that is disposed between a front end of a front side member of an automobile and a front bumper reinforcement, and whose yield strength with respect to an axial compressive load is set to be less than that of the front side member; and a dilatant impact absorbing body that is formed of D3O™ and is disposed between the front end of the front side member and the front bumper reinforcement, a space for permitting axial compressive deformation of the crash box at a time of a front collision of the automobile being provided between the dilatant impact absorbing body and one of both, and a length dimension of the dilatant impact absorbing body in a vehicle longitudinal direction being set such that the dilatant impact absorbing body receives a compressive load between the both when an axial compressive deformation amount of the crash box becomes greater than or equal to a set value that is less than a maximum value of the axial compressive deformation amount.

In the automobile front portion structure, relating to the first aspect of the invention, the crash box and the dilatant impact absorbing body are disposed between the front end of the front side member and the front bumper reinforcement. Further, a space, that is for permitting an axial compressive deformation (plastic deformation) of the crash box at the time of a front collision of the automobile, is provided between this dilatant impact absorbing body, and one of the front side member and the front bumper reinforcement. Moreover, the length dimension, in the vehicle longitudinal direction, of this dilatant impact absorbing body is set such that, when the axial compressive deformation amount of the crash box becomes greater than or equal to a set value (a predetermined set value) that is less than the maximum value of the axial compressive deformation amount, the dilatant impact absorbing body receives compressive load between the front side member and the front bumper reinforcement.

Here, in a case in which the collision speed of the automobile is high, the axial compressive deformation amount of the crash box becomes large. However, in this invention, at the time when the axial compressive deformation amount of the crash box becomes greater than or equal to the set value that is less than the maximum value of the axial compressive deformation amount, the dilatant impact absorbing body receives a compressive load (impact force) between the front bumper reinforcement and the front side member. As a result, the dilatant impact absorbing body instantaneously absorbs energy and hardens, and the collision load that the front side member receives suddenly increases. Due thereto, the floor G can be increased suddenly before the axial compressive deformation amount of the crash box becomes the maximum.

On the other hand, in a case in which the axial compressive deformation amount of the crash box is less than the set value, i.e., in a case in which the collision speed of the automobile is low (at the time of a minor collision), the dilatant impact absorbing body does not receive the compressive load, and the energy of the collision is absorbed by the axial compressive deformation of the crash box. Due thereto, damage to the front side member is prevented, and therefore, the ability to withstand damage and the repairability of the vehicle body front portion can be improved.

In an automobile front portion structure relating to a second aspect of the invention, in the automobile front portion structure relating to the first aspect of the invention, the crash box is formed in a tubular shape whose front side member side is open, and the dilatant impact absorbing body is accommodated within the crash box and is fixed to a front end surface of the front side member.

In the automobile front portion structure, relating to the second aspect of the invention, because the dilatant impact absorbing body is accommodated within the crash box, there is no need to set a new space for installation of the dilatant impact absorbing body. Moreover, the dilatant impact absorbing body, that is soft at usual times, can be protected by the crash box.

In an automobile front portion structure relating to a third aspect of the invention, in the automobile front portion structure relating to the second aspect of the invention, the dilatant impact absorbing body is formed in a shape that is substantially similar to a cross-sectional shape of a peripheral wall of the crash box, and is disposed coaxially to the peripheral wall.

In the automobile front portion structure relating to the third aspect of the invention, the dilatant impact absorbing body, that is accommodated within the tubular crash box, is formed in a shape (e.g., a tubular shape having a rectangular cross-section or a hexagonal cross-section) that is substantially similar to the cross-sectional shape of the peripheral wall of the crash box, and is disposed coaxially to this peripheral wall. Due thereto, the load from the front bumper reinforcement can be transmitted well to the front side member via the dilatant impact absorbing body that has hardened. Further, because the dilatant impact absorbing body is formed in a tube shape (a hollow shape), lightening of the weight of the dilatant impact absorbing body can be devised. Note that "coaxially" that is recited in the third aspect of the invention does not have to be strictly coaxially, and some error in light of design or manufacturing is permitted.

In an automobile front portion structure relating to a fourth aspect of the invention, in the automobile front portion structure relating to the second or third aspect of the invention, a gap, that prevents a peripheral wall of the crash box and the dilatant impact absorbing body from interfering with one another at a time of axial compressive deformation of the crash box, is formed between the peripheral wall of the crash box and the dilatant impact absorbing body.

In the automobile front portion structure relating to the fourth aspect of the invention interference between the peripheral wall of the crash box and the dilatant impact absorbing body at the time of axial compressive deformation of the crash box is prevented by the gap that is formed between the peripheral wall of the crash box and the dilatant impact absorbing body. Therefore, the dilatant impact absorbing body can be prevented from hardening inadvertently due to such interference.

In an automobile front portion structure relating to fifth aspect of the invention, in the automobile front portion structure relating to the second aspect through the fourth aspect of the invention, the crash box is formed in a shape of a tube having a bottom whose bottom wall is provided at the front bumper reinforcement side, and a bulging portion that bulges toward the dilatant impact absorbing body side is provided at the bottom wall, and the bulging portion is structured so as to collide with the dilatant impact absorbing body when the axial compressive deformation amount of the crash box becomes greater than or equal to the set value.

In the automobile front portion structure relating to the fifth aspect of the invention, the bulging portion, that bulges toward the side of the dilatant impact absorbing body that is accommodated within the crash box and is fixed to the front end of the front side member, is provided at the bottom wall of the crash box that is formed in the shape of a tube having a bottom. When the axial compressive deformation amount of the crash box becomes greater than or equal to the set value, this bulging portion collides with the dilatant impact absorbing body and hardens the dilatant impact absorbing body. Namely, in the present invention, the aforementioned set value for hardening the dilatant impact absorbing body can be set (adjusted) in accordance with the dimension, in the vehicle longitudinal direction, of the bulging portion. Accordingly, the degrees of freedom in setting improve as compared with a case in which the dimensions of the peripheral wall of the crash box or the dimensions of the dilatant impact absorbing body are changed.

Advantageous Effects of Invention

As described above, in the automobile front portion structure relating to the present invention, the ability to withstand damage and the repairability of the vehicle body front portion can be improved, and the floor G can be suddenly increased before the axial compressive deformation amount of the crash box becomes a maximum.

BEST MODE FOR CARRYING OUT THE INVENTION

Figure 1:
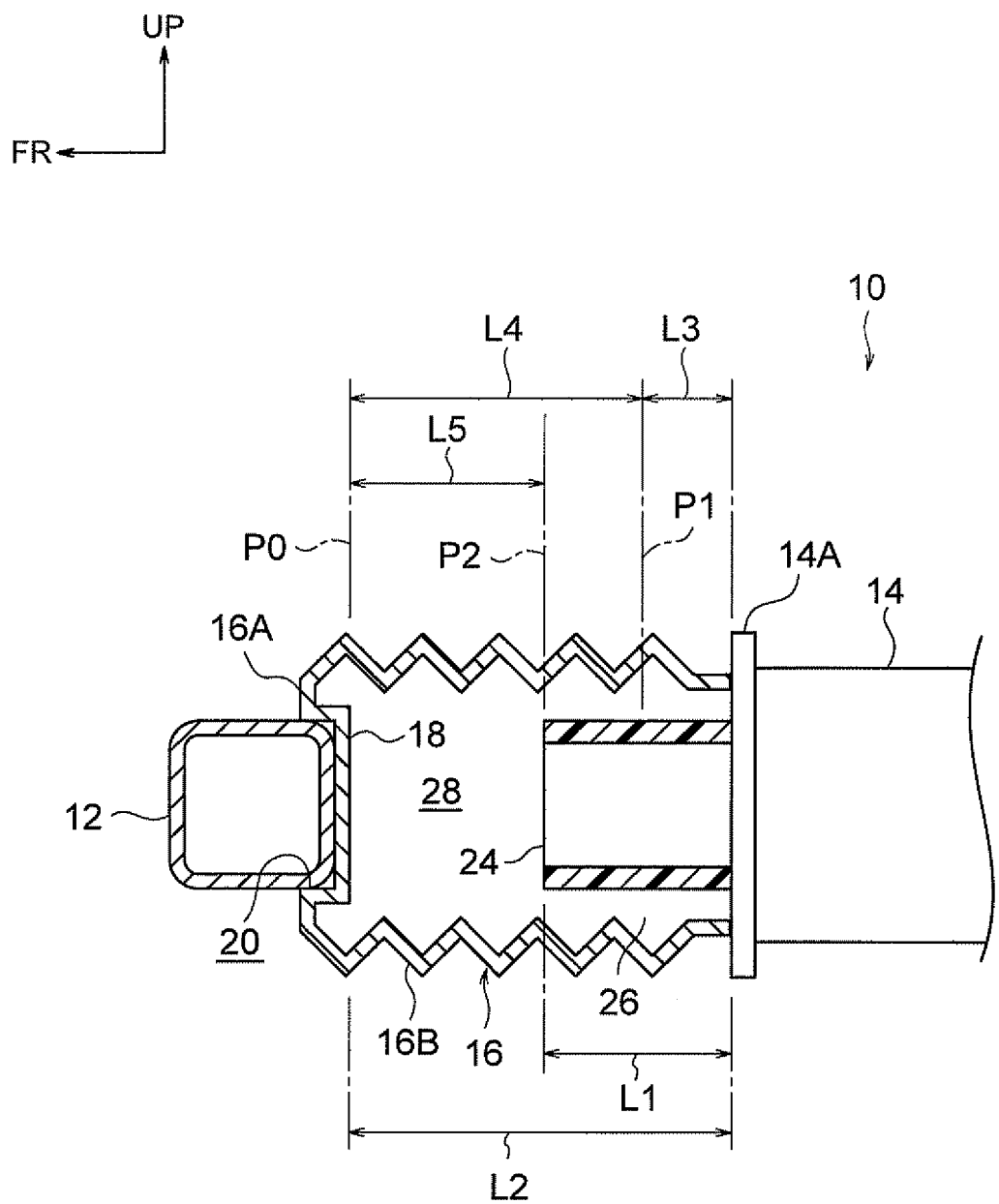
FIG. 1 is a vertical sectional view showing an automobile front portion structure relating to an embodiment of the present invention.

An automobile front portion structure 10 relating to an embodiment of the present invention is described hereinafter by using FIG. 1 through FIG. 7. Note that arrow FR in the drawings indicates the vehicle front side, and arrow UP indicates the vehicle upper side.

As shown in FIG. 1, in the automobile front portion structure 10 relating to the present embodiment, a front bumper reinforcement 12 is disposed along the vehicle transverse direction at the front end portion of the front body of the vehicle body. This front bumper reinforcement 12 is formed by an extrusion material of, for example, an aluminum alloy.

A pair of left and right front side members 14, that structure the skeleton of the vehicle body, are disposed at the vehicle rear side of the front bumper reinforcement 12 (note that, for convenience of explanation, only one of the front side members 14 is shown in FIG. 1). These front side members 14 are disposed at the lower portions of the vehicle transverse direction both end portions, and are closed cross-sectional structures that extend in the vehicle longitudinal direction. Further, a panel 14A, that is made of metal and whose outer peripheral portion projects-out in a flange shape, is welded to the front end of each front side member 14.

A crash box 16 is connected coaxially to the vehicle front side of the front side member 14, with the panel 14A interposed therebetween. The crash box 16 is formed of an aluminum alloy or the like, and a bottom wall 16A is provided at the front bumper reinforcement 12 side thereof, and the crash box 16 is formed in the shape of a rectangular tube having a bottom, whose front side member 14 side thereof is open. The height dimension, along the vehicle vertical direction, of the crash box 16 is set to be larger than the width dimension, along the vehicle transverse direction, of the crash box 16. At this crash box 16, a peripheral wall 16B, that is rectangular in cross-section as seen from the vehicle longitudinal direction, is formed in a bellows-shape, and an unillustrated flange portion, that is provided at the open side of the peripheral wall 16B, is fastened and fixed by bolts or the like to the panel 14A of the front side member 14.

The central portion of the bottom wall 16A of the crash box 16 is made to be a bulging portion 18 that bulges toward the vehicle rear side. The rear end surface, that is formed to be flat, of the bulging portion 18 is disposed substantially perpendicular to the vehicle longitudinal direction. Further, a concave portion 20 that corresponds to the bulging portion 18 is formed at the front surface side of the bottom wall 16A. The rear end portion of the front bumper reinforcement 12 is fit into this concave portion 20. The front bumper reinforcement 12 is welded to the crash box 16, and the crash box 16 is disposed between the front bumper reinforcement 12 and the front side member 14.

The yield strength, with respect to axial compressive load (i.e., compressive load along the vehicle longitudinal direction) of the above-described crash box 16 is set to be lower than that of the front side member 14. Therefore, at the time when the automobile is involved in a front collision, the crash box 16 axially compressively deforms (plastically deforms) before the front side member 14.

A dilatant impact absorbing body 24 is accommodated at the inner side of the crash box 16. The dilatant impact absorbing body 24 is formed of a material having dilatant characteristics, e.g., "d3o™" that is manufactured by d3o™ lab of England. This "d3o™" is a material that is flexible when impact is not being applied thereto or when the impact is weak, and, when a strong impact is applied thereto, hardens instantaneously, and exhibits an excellent energy absorption performance.

Figure 2:
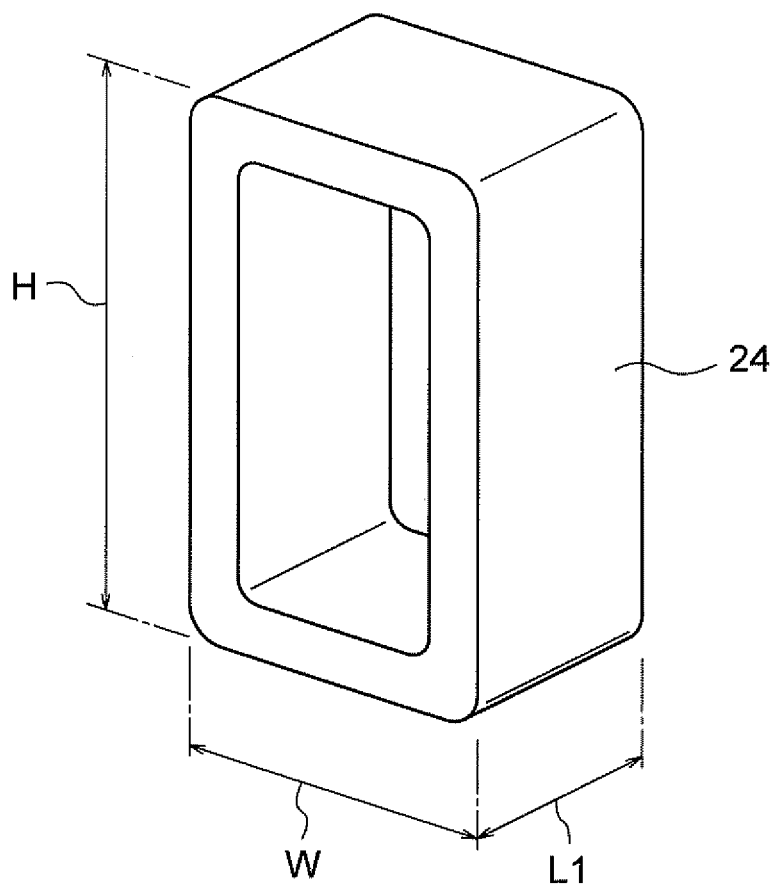
FIG. 2 is a perspective view of a dilatant impact absorbing body that is a structural member of the automobile front portion structure relating to the embodiment of the present invention.

This dilatant impact absorbing body 24 is formed in a rectangular tube shape that is a shape similar to the cross-sectional shape of the peripheral wall 16B of the crash box 16 (see FIG. 2). This dilatant impact absorbing body 24 is disposed coaxially to the peripheral wall 16B, and the rear end surface thereof is fixed to the panel 14A of the front side member 14 by a means such as, for example, adhesion or the like. A gap 26, that prevents the peripheral wall 16B and the dilatant impact absorbing body 24 from interfering with one another at the time of axial compressive deformation of the crash box 16, is formed between this dilatant impact absorbing body 24 and the peripheral wall 16B of the crash box 16. Further, a height dimension H along the vehicle vertical direction and a width dimension W along the vehicle transverse direction of this dilatant impact absorbing body 24 are set to be smaller than those of the above-described bulging portion 18, and the front end surface of the dilatant impact absorbing body 24 faces the rear end surface of the bulging portion 18.

Moreover, a length dimension L1 along the vehicle longitudinal direction of this dilatant impact absorbing body 24 is set to be sufficiently shorter than (e.g., to about half of) a length dimension L2 along the vehicle longitudinal direction from the rear end surface of the bulging portion 18, i.e., the rear end surface of the bottom wall 16A, to the panel 14A. Due thereto, a space 28 for permitting axial compressive deformation of the crash box 16 is provided between the dilatant impact absorbing body 24 and the front bumper reinforcement 12.

However, the length dimension L1 of the dilatant impact absorbing body 24 is set to be larger than the length dimension along the vehicle longitudinal direction from the rear end surface of the bulging portion 18 to the panel 14A, in a state in which the crash box 16 has been completely crushed due to collision load, i.e., a state in which the axial compressive deformation amount of the crash box 16 has become the maximum. Namely, when the crash box 16 is completely crushed, the bulging portion 18 withdraws to the position shown by one-dot chain line P1 in FIG. 1, but the length dimension L1 of the crash box 16 is set to be greater than rectilinear distance L3 along the vehicle longitudinal direction from this one-dot chain line P1 to the panel 14A (note that, in FIG. 1, one-dot chain line P0 illustrates the position of the rear end surface of the bulging portion 18 before the crash box 16 is crushed).

Therefore, in the present embodiment, before the axial compressive deformation amount of the crash box 16 at the time of a front collision of the automobile reaches a maximum value L4 thereof, the rear end surface of the bulging portion 18 collides with the front end surface of the dilatant impact absorbing body 24. In other words, when the axial compressive deformation amount of the crash box 16 becomes greater than or equal to a set value L5 that is smaller than the maximum value L4 of the axial compressive deformation amount (when the bulging portion 18 withdraws to the position shown by one-dot chain line P2 in FIG. 1), the rear end surface of the bulging portion 18 collides with the front end surface of the dilatant impact absorbing body 24. This set value L5 is set in consideration of the ability to withstand damage and the repairability (the so-called damageability) of the vehicle body front portion at the time of a minor collision, and the passenger protecting performance at the time of a collision in which the collision speed is high.

Figure 3:
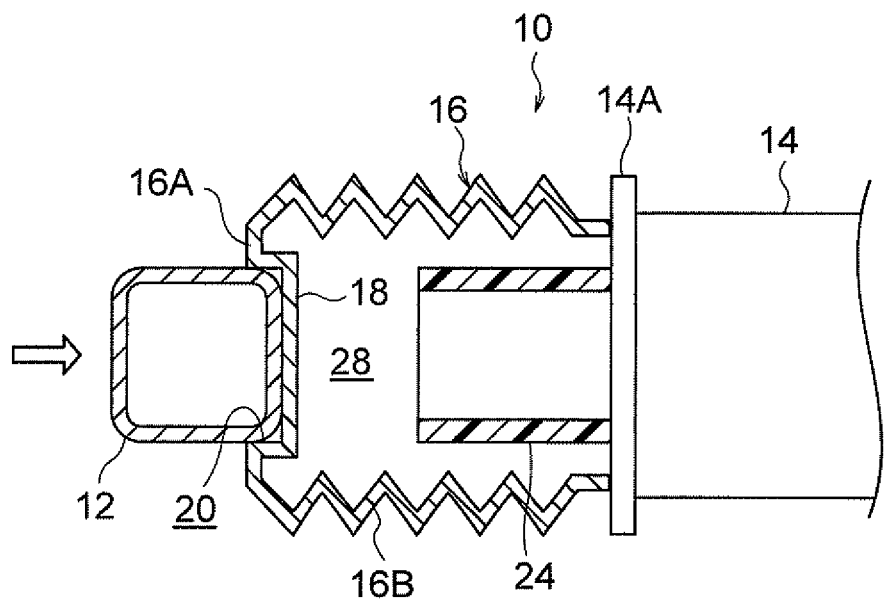
FIG. 3 is a vertical sectional view that corresponds to FIG. 1 and is for explaining an axial compressive deformation amount of a crash box at a time when an automobile relating to the embodiment of the present invention is involved in an offset rigid barrier collision of a speed of 15 kilometers per hour.

Concretely, when the automobile is involved in an offset rigid barrier collision of a speed of 15 kilometers per hour (a minor collision), the bulging portion 18 withdraws to the position shown in FIG. 3. Namely, the material and the dimensions of the respective portions of the crash box 16, and the length dimension L1 of the dilatant impact absorbing body 24, are set such that, in this form of a collision, the axial compressive deformation amount of the crash box 16 is less than the aforementioned set value L5. In this case, the bulging portion 18 does not collide with the dilatant impact absorbing body 24, and only the crash box 16 axially compressively deforms.

Figure 4:
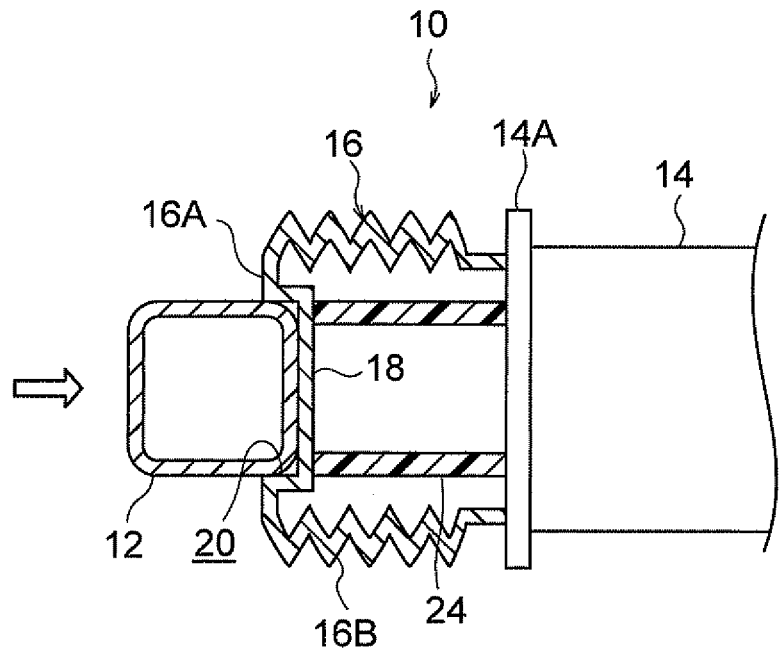
FIG. 4 is a vertical sectional view that corresponds to FIG. 1 and is for explaining the axial compressive deformation amount of the crash box at a time when the automobile relating to the embodiment of the present invention is involved in an offset rigid barrier collision of a speed of 25 kilometers per hour.

On the other hand, when the automobile is involved in a full-overlap rigid barrier collision of a speed of 25 kilometers per hour (a collision in which the collision speed is high), the bulging portion 18 withdraws to the position shown in FIG. 4. Namely, the material and the dimensions of the respective portions of the crash box 16, and the length dimension L1 of the dilatant impact absorbing body 24, are set such that, in this form of a collision, the axial compressive deformation amount of the crash box 16 becomes greater than or equal to the aforementioned set value L5. In this case, the bulging portion 18 collides with the dilatant impact absorbing body 24, and the dilatant impact absorbing body 24 receives compressive load (impact force) between the front bumper reinforcement 12 and the front side member 14.

Namely, in the present embodiment, there is a structure in which, at the time of a minor collision (the time of an offset rigid barrier collision of a speed of 15 kilometers per hour), only the crash box 16 is axially compressively deformed, and, at the time of a collision that surpasses a minor collision (a full-overlap rigid barrier collision of a speed of 25 kilometers per hour), impact force is applied to the dilatant impact absorbing body 24 accompanying the progression of the axial compressive deformation of the crash box 16.

Note that the present embodiment is structured such that, when the automobile is involved in a full-overlap rigid barrier collision of a speed that is greater than or equal to 25 kilometers per hour, an airbag device that is installed in the automobile operates.

Operation and effects of the present embodiment are described next. In the automobile front portion structure 10 of the above-described structure, when the automobile is involved in an offset rigid barrier collision of a speed of 15 kilometers per hour (a minor collision), due to the load from the front bumper reinforcement 12, the crash box 16 axially compressively deforms, and the bulging portion 18 withdraws to the position shown in FIG. 3. In this case, the bulging portion 18 does not collide with the dilatant impact absorbing body 24, and only the crash box 16 axially compressively deforms, and the energy of the collision is absorbed. Due thereto, damage to the front side member 14 is prevented, and therefore, the ability to withstand damage and the repairability of the vehicle body front portion improve.

Figure 5:
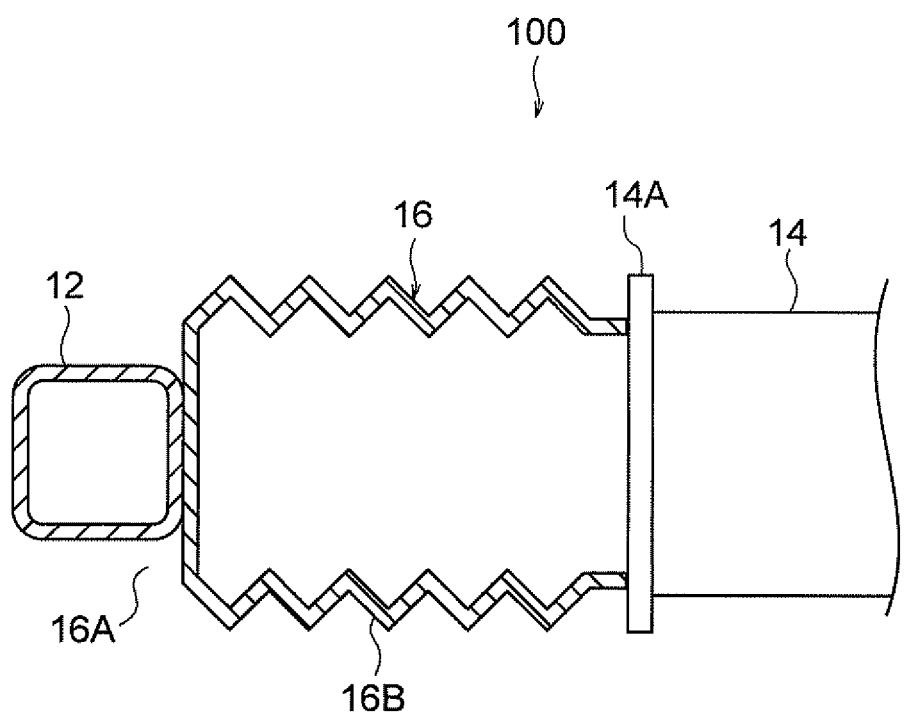
FIG. 5 is a vertical sectional view that corresponds to FIG. 1 and shows a comparative example of the embodiment of the present invention.

On the other hand, when the automobile is involved in a full-overlap rigid barrier collision of a speed of 25 kilometers per hour, due to the load from the front bumper reinforcement 12, the crash box 16 axially compressively deforms, and the bulging portion 18 withdraws to the position shown in FIG. 5. In this case, the bulging portion 18 collides with the dilatant impact absorbing body 24, and the dilatant impact absorbing body 24 receives compressive load (impact force) between the front bumper reinforcement 12 and the front side member 14. As a result, the dilatant impact absorbing body 24 instantaneously absorbs energy and hardens, and the collision load that the front side member 14 receives increases suddenly. Due thereto, the floor G (the deceleration of the vehicle body floor portion) increases suddenly, before the axial compressive deformation amount of the crash box 16 becomes the maximum.

Namely, in the present embodiment, when the automobile is involved in a full-overlap rigid barrier collision of a speed of 25 kilometers per hour, due to the dilatant impact absorbing body 24 hardening, the collision load that the front side member 14 receives suddenly increases, and as a result, the floor G rises sharply at the stage of the initial stage of the collision.

Figure 6:
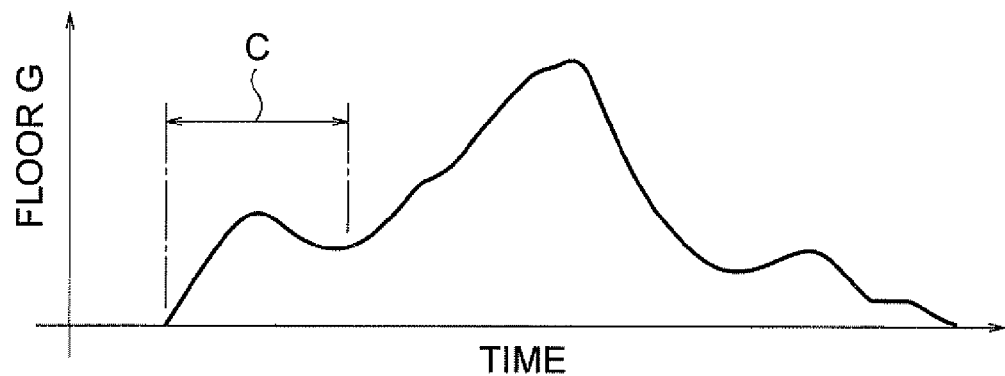
FIG. 6 is a graph showing the relationship between floor G and time at a time when an automobile relating to the comparative example is involved in a full-overlap rigid barrier collision of a speed of 56 kilometers per hour.

In contrast, in a comparative example 100 shown in FIG. 5, the collision load that the front side member 14 receives does not increase suddenly until the crash box 16 is completely crushed, and therefore, as shown in FIG. 6, the floor G is larger at the middle stage of the collision and thereafter than at the initial stage of the collision. Note that FIG. 6 is a graph showing the relationship between the floor G and time at the time when an automobile relating to the comparative example 100 is involved in a full-overlap rigid barrier collision of a speed of 56 kilometers per hour, and the region denoted by reference numeral C is the region in which the crash box 16 is axially compressively deforming.

In a case in which the floor G becomes large in the middle stage of the collision and thereafter such as this comparative example 100, the maximum value of the passenger deceleration, that rises in the middle stage of the collision and thereafter, becomes large. In other words, when the floor G becomes large in the middle stage of the collision and thereafter, the value that is derived by integrating one time this floor G, i.e., the velocity of the passenger with respect to the vehicle body floor portion, becomes large. As a result, the maximum value of the passenger deceleration at the time when the passenger is restrained by the seatbelt or the airbag becomes large, and the impact that the passenger receives from the seatbelt or the airbag becomes large.

Figure 7:
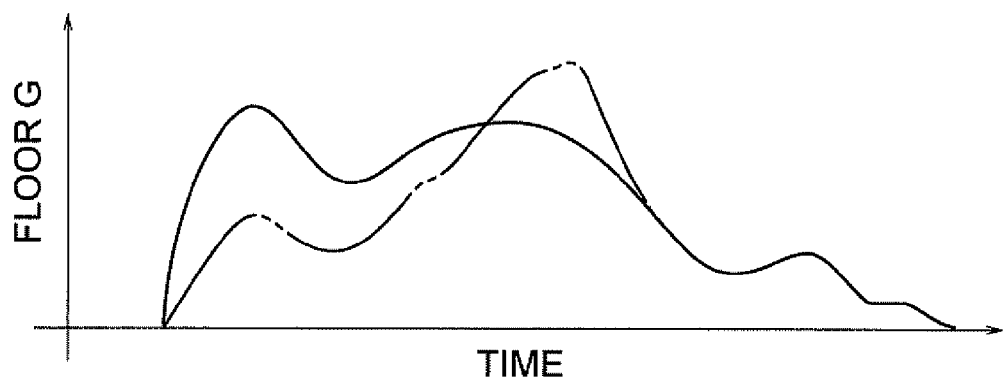
FIG. 7 is a graph showing the relationship between floor G and time at a time when the automobile relating to the comparative example relating to the embodiment of the present invention is involved in a full-overlap rigid barrier collision of a speed of 56 kilometers per hour.

With regard to this point, in the present embodiment, as shown in FIG. 7, in the stage of the initial stage of the collision, the floor G rises sharply, and the floor G at the middle stage of the collision and thereafter decreases. Therefore, the maximum value of the passenger deceleration can be reduced. Due thereto, the impact that the passenger receives from the seatbelt or the airbag can be made to be small. Note that FIG. 7 is a graph showing the relationship between the floor G and time at the time when the automobile relating to the present embodiment is involved in a full-overlap rigid barrier collision of a speed of 56 kilometers per hour.

Moreover, in the present embodiment, because the dilatant impact absorbing body 24 is accommodated within the crash box 16, there is no need to set a new space for installing the dilatant impact absorbing body 24. Further, the dilatant impact absorbing body 24 that is soft at usual times can also be protected by the crash box 16.

Further, in the present embodiment, the dilatant impact absorbing body 24 that is accommodated within the tubular crash box 16 is formed in the shape of a rectangular tube that is a shape that is similar to the cross-sectional shape of the peripheral wall 16B of the crash box 16, and the dilatant impact absorbing body 24 is disposed coaxially to the peripheral wall 16B. Due thereto, the load from the front bumper reinforcement 12 can be transmitted well to the front side member 14 via the dilatant impact absorbing body 24 that has hardened. Further, because the dilatant impact absorbing body 24 is formed in a tube shape (a hollow shape), lightening of the weight of the dilatant impact absorbing body 24 can be devised.

Moreover, in the present embodiment, the gap 26, that prevents the peripheral wall 16B and the dilatant impact absorbing body 24 from interfering with one another at the time of axial compressive deformation of the crash box 16, is formed between the dilatant impact absorbing body 24 and the peripheral wall 16B of the crash box 16. Due thereto, the dilatant impact absorbing body 24 can be prevented from hardening inadvertently due to interference between the peripheral wall 16B and the dilatant impact absorbing body 24.

Further, in the present embodiment, the crash box 16 is formed in the shape of a tube having a bottom, and the bulging portion 18, that bulges toward the dilatant impact absorbing body 24 side, is provided at the bottom wall 16A of the crash box 16. When the axial compressive deformation amount of the crash box 16 becomes greater than or equal to the set value L5, this bulging portion 18 collides with the dilatant impact absorbing body 24, and hardens the dilatant impact absorbing body 24. Namely, the set value L5 for hardening the dilatant impact absorbing body 24 can be set (adjusted) in accordance with the dimension, along the vehicle longitudinal direction, of the bulging portion 18. Therefore, the degrees of freedom in setting improve as compared with a case in which the dimensions of the peripheral wall 16B of the crash box 16 or the dimensions of the dilatant impact absorbing body 24 are changed.

Note that the above-described embodiment is a structure in which the crash box is formed in the shape of a tube having a bottom. However, the inventions relating to the first aspect through the fourth aspect of the invention are not limited to this, and may be structures in which the bottom wall 16A of the crash box 16 is omitted, i.e., structures in which the crash box 16 is formed in a simple tube shape.

Further, although the above-described embodiment is a structure in which the bulging portion 18 is provided at the bottom wall 16A of the crash box 16, the inventions relating to the first aspect through the fourth aspect of the invention are not limited to this, and may be structures in which the bulging portion 18 is omitted.

Further, although the above-described embodiment is a structure in which the peripheral wall 16B of the crash box 16 is formed in a bellows shape, the structures relating to the first aspect through the fifth aspect of the invention are not limited to this, and may be structures in which the bellows is omitted. Further, the above-described embodiment is a structure in which the cross-sectional shape of the peripheral wall 16B is formed in a rectangular shape, but the inventions relating to the first aspect through the fifth aspect of the invention are not limited to this, and may be structures in which, for example, the cross-sectional shape of the peripheral wall 16B is formed in a hexagonal shape or a circular shape. In addition, the shape of the crash box 16 can be changed appropriately.

Further, the above-described embodiment is a structure in which the dilatant impact absorbing body 24 is formed in a shape that is similar to the cross-sectional shape of the peripheral wall 16B of the crash box 16, and is disposed coaxially to the peripheral wall 16B. However, the invention relating to the first aspect or second aspect of the invention is not limited to this, and the shape and placement of the dilatant impact absorbing body 24 can be changed appropriately.

Moreover, although the above-described embodiment is a structure in which the dilatant impact absorbing body 24 is accommodated within the crash box 16, the invention relating to the first aspect of the invention is not limited to this. It suffices for the dilatant impact absorbing body to be disposed between the front end of the front side member 14 and the front bumper reinforcement 12.

Further, the above-described embodiment is a structure in which the dilatant impact absorbing body 24 is fixed to the front end surface of the front side member 14, but the invention relating to the first aspect of the invention is not limited to this, and may be a structure in which the dilatant impact absorbing body 24 is fixed to the bottom wall 16A of the crash box 16. Further, in a case in which the bottom wall 16A of the crash box 16 is omitted, there may be a structure in which the dilatant impact absorbing body 24 is fixed to the rear end surface of the front bumper reinforcement 12.

In addition, the present invention can be implemented by being changed in various ways within a scope that does not deviate from the gist thereof. Further, it goes without saying that the scope of the right of the present invention is not limited to the above-described respective embodiments.

The invention claimed is:

1. An automobile front portion structure for use with an automobile, the automobile front portion structure comprising:
   a crash box that is disposed between a front end of a front side member of the automobile and a front bumper reinforcement, and whose yield strength with respect to an axial compressive load is set to be less than that of the front side member; and
   a dilatant impact absorbing body that is formed of D3O™ and is disposed between the front end of the front side member and the front bumper reinforcement, a space for permitting axial compressive deformation of the crash box at a time of a front collision of the automobile being provided between the dilatant impact absorbing body and one of both, and a length dimension of the dilatant impact absorbing body in a vehicle longitudinal direction being set such that the dilatant impact absorbing body receives a compressive load between the both when an axial compressive deformation amount of the crash box becomes greater than or equal to a set value that is less than a maximum value of the axial compressive deformation amount, wherein
   the crash box is formed in a tubular shape whose front side member side is open, and the dilatant impact absorbing body is accommodated within the crash box and is fixed to a front end surface of the front side member, and the dilatant impact absorbing body is formed in a tubular shape that is substantially similar to a cross-sectional shape of a peripheral wall of the crash box, and is disposed coaxially to the peripheral wall, and
   a first length dimension of the dilatant impact absorbing body along the vehicle longitudinal direction is shorter than a second length dimension of the crash box along the vehicle longitudinal direction.

2. The automobile front portion structure of claim 1, wherein a gap, that prevents a peripheral wall of the crash box and the dilatant impact absorbing body from interfering with one another at a time of axial compressive deformation of the crash box, is formed between the peripheral wall of the crash box and the dilatant impact absorbing body.

3. The automobile front portion structure of claim 1, wherein the crash box is formed in a shape of a tube having a bottom whose bottom wall is provided at the front bumper reinforcement side, and a bulging portion that bulges toward the dilatant impact absorbing body side is provided at the bottom wall, and the bulging portion is structured so as to collide with the dilatant impact absorbing body when the axial compressive deformation amount of the crash box becomes greater than or equal to the set value.

4. The automobile front portion structure of claim 2, wherein the crash box is formed in a shape of a tube having a bottom whose bottom wall is provided at the front bumper reinforcement side, and a bulging portion that bulges toward the dilatant impact absorbing body side is provided at the bottom wall, and the bulging portion is structured so as to collide with the dilatant impact absorbing body when the axial compressive deformation amount of the crash box becomes greater than or equal to the set value.

* * * * *